(12) United States Patent
Viswanath et al.

(10) Patent No.: US 6,798,788 B1
(45) Date of Patent: *Sep. 28, 2004

(54) ARRANGEMENT DETERMINING POLICIES FOR LAYER 3 FRAME FRAGMENTS IN A NETWORK SWITCH

(75) Inventors: Somnath Viswanath, Sunnyvale, CA (US); Mrudula Kanuri, Santa Clara, CA (US); Xiaohua Zhuang, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/482,957

(22) Filed: Jan. 14, 2000

Related U.S. Application Data

(60) Provisional application No. 60/167,218, filed on Nov. 24, 1999.

(51) Int. Cl.[7] ............................................. H04L 12/56
(52) U.S. Cl. ...................................................... 370/469
(58) Field of Search ................................ 370/389, 392, 370/395.5, 395.52, 412, 419, 428, 429, 465, 469, 474, 229, 230, 235

(56) References Cited

U.S. PATENT DOCUMENTS

| | | | | |
|---|---|---|---|---|
| 5,892,924 A | * | 4/1999 | Lyon et al. .................. 709/245 |
| 5,909,686 A | * | 6/1999 | Muller et al. ............. 707/104.1 |
| 5,920,566 A | * | 7/1999 | Hendel et al. ............... 370/401 |
| 5,953,335 A | | 9/1999 | Erimli et al. |
| 6,094,435 A | * | 7/2000 | Hoffman et al. ............ 370/414 |
| 6,104,700 A | * | 8/2000 | Haddock et al. ............ 370/235 |
| 6,157,955 A | * | 12/2000 | Narad et al. ................. 709/228 |
| 6,243,667 B1 | * | 6/2001 | Kerr et al. ..................... 703/27 |
| 6,275,861 B1 | * | 8/2001 | Chaudri et al. ............. 709/238 |
| 6,286,052 B1 | * | 9/2001 | McCloghrie et al. ........ 709/238 |
| 6,674,769 B1 | * | 1/2004 | Viswanath ................... 370/469 |

OTHER PUBLICATIONS

Aweya, IP Router Architecture: An Overview, Nortel Networks, pp. 1–48, 1999, downloadable at http://citeseer.nj.nec.com/aweya99ip.html.*

Chandranmenon et al, Trading Packet Headers for Packet Processing, IEEE, pp. 141–152, Apr. 1996.*

Turner et al, AITPM: a Strategy for Integrating IP with ATM, ACM, pp. 49–58, 1995.*

* cited by examiner

*Primary Examiner*—Frank Duong
(74) *Attorney, Agent, or Firm*—Manelli Denison & Selter PLLC; Leon R. Turkevich

(57) ABSTRACT

A network switch, configured for performing layer 2 and layer 3 switching in an Ethernet (IEEE 802.3) network without blocking of incoming data packets, includes network switch ports, each including a policy filter configured for obtaining layer 3 and layer 4 information from a received layer 2 frame. The layer 3 information and the layer 4 information is used to determine a policy identifier that specifies a layer 3 switching operation to be performed on the received layer 2 frame. Each network switch port also includes a flow identification module that caches portions of the layer 3 information and the corresponding policy identifier. The cached portions of the layer 3 information and the corresponding policy identifier are then used by the flow identification module to identify the appropriate policy for subsequent fragmented layer 3 frames that lack the layer 4 information necessary for performing another policy lookup, but that have sufficient layer 3 information to uniquely identify each layer three flow. Hence, each layer 3 fragment can be assigned a unique policy for execution of layer 3 switching decisions.

20 Claims, 5 Drawing Sheets

ARRANGEMENT DETERMINING POLICIES FOR LAYER 3 FRAME FRAGMENTS IN A NETWORK SWITCH

This application claims priority from Provisional Application No. 60/167,218, filed Nov. 24, 1999.

BACKGROUND OF THE INVENTION

1. Field of the Invention

The present invention relates to layer 2 and layer 3 switching of data packets in a non-blocking network switch configured for switching data packets between subnetworks.

2. Background Art

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of data packets. The full-duplex media access mechanism provides a two-way, point-to-point communication link between two network elements, for example between a network node and a switched hub.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received data packet may include a VLAN (virtual LAN) tagged frame according to IEEE 802.1q protocol that specifies another subnetwork (via a router) or a prescribed group of stations. Since the switching occurs at the layer 2 level, a router is typically necessary to transfer the data packet between subnetworks.

Efforts to enhance the switching performance of a network switch to include layer 3 (e.g., Internet protocol) processing may suffer serious drawbacks, as current layer 2 switches preferably are configured for operating in a non-blocking mode, where data packets can be output from the switch at the same rate that the data packets are received. Newer designs are needed to ensure that higher speed switches can provide both layer 2 switching and layer 3 switching capabilities for faster speed networks such as 100 Mbps or gigabit networks.

However, such design requirements risk loss of the non-blocking features of the network switch, as it becomes increasingly difficult for the switching fabric of a network switch to be able to perform layer 3 processing at the wire rates (i.e., the network data rate). For example, switching fabrics in layer 2 switches merely need to determine an output port for an incoming layer 2 data packet. Layer 3 processing, however, requires implementation of user-defined policies that specify what type of data traffic may be given priority accesses at prescribed intervals; for example, one user defined policy may limit Internet browsing by employees during work hours, and another user-defined policy may assign a high priority to e-mail messages from corporate executives.

Layer 3 processing in a network switch may be particularly difficult for layer 2 data packets carrying fragmented layer 3 frames, for example Internet Protocol (IP) frame fragments. In particular, only the first transmitted IP frame fragment of the group of fragments will include sufficient layer 3 information and layer 4 information (e.g., TCP/UDP source port and/or TCP/UDP destination port) for layer 3 processing of user-defined policies; subsequent IP frame fragments, however, will not have layer 4 information for layer 3 processing of user defined policies. Hence, the subsequent IP frame fragments normally cannot undergo Layer 3 processing, preventing the layer 3 switching of fragmented layer 3 frames according to user-defined policies.

SUMMARY OF THE INVENTION

There is a need for an arrangement that enables a network switch to provide layer 2 switching and layer 3 switching capabilities for 100 Mbps and gigabit links without blocking of the data packets.

There is also a need for an arrangement that enables a network switch to provide layer 2 switching and layer 3 switching capabilities with minimal buffering within the network switch that may otherwise affect latency of switched data packets.

There is also a need for an arrangement that enables a network switch to perform layer 3 processing of user-defined policies at the network wire rate on layer 2 data packets carrying fragmented layer 3 frames.

These and other needs are attained by the present invention, where a network switch includes network switch ports, each including a policy filter configured for obtaining layer 3 and layer 4 information from a received layer 2 frame. The layer 3 information and the layer 4 information are used to determine a policy identifier that specifies a layer 3 switching operation to be performed on the received layer 2 frame. Each network switch port also includes a flow identification module that caches portions of the layer 3 information and the corresponding policy identifier. The cached portions of the layer 3 information and the corresponding policy identifier are then used by the flow identification module to identify the appropriate policy for subsequent fragmented layer 3 frames that lack the layer 4 information necessary for performing another policy lookup, but that have sufficient layer 3 information to uniquely identify each layer three flow. Hence, each layer 3 fragment can be assigned a unique policy for execution of layer 3 switching decisions.

One aspect of the present invention provides a method in a network switch. The method includes receiving a first layer 2 frame at a network switch port, the first layer 2 frame including first layer 3 information and layer 4 information that specify payload data characteristics within the first layer 2 frame. A policy identifier is determined in the network switch port for the first layer 2 frame based on the first layer 3 information and the layer 4 information, the policy identifier specifying a layer 3 switching operation to be performed on the first layer 2 frame. The method also includes receiving a second layer 2 frame at the network switch port, the second layer 2 frame including a portion of the first layer 3 information, and selecting the policy identifier of the first layer 2 frame for the second layer 2 frame by correlating the second layer 2 frame to the first layer 2 frame based on the portion of the first layer 3 information. The selection of the policy identifier for the second layer 2 frame based on correlation between the layer 3 information enables the second layer 2 frame, which may lack the layer 4 information for an independent policy identification, enables the network switch port to utilize the previously determined policy identifier by uniquely identifying the layer 3 information of the first and second layer 2 frames. Hence, layer 2 frames carrying layer 3 information can be switched according to the same layer 3 switching operation by identifying the layer 2 frames carrying higher level data for the same high level data flows.

Another aspect of the present invention provides a method of identifying a layer 3 switching decision within an integrated network switch. The method includes identifying within a network switch port a received layer 2 frame as having one of a plurality of layer 3 frame fragments of a layer 4 data stream. In response to the identification in the received layer 2 frame, first layer 3 information from a first of the layer 3 frame fragments is stored in a memory within the network switch port, along with a policy identifier that specifies a layer 3 switching operation to be performed on the corresponding layer 2 frame carrying the first of the layer 3 frame fragments based on the corresponding layer 3 information and layer 4 information. The method also includes selecting the policy identifier, for subsequent ones of the layer 3 frame fragments following the first of the layer 3 frame fragments, based on a portion of the first layer 3 information in each of the subsequent ones of the layer 3 frame fragments. Selection of the policy identifier based on the portion of the first layer 3 information enables the same layer 3 switching operation to be performed on the layer 2 frames carrying the layer 3 frame fragments of a layer 4 data stream, merely by comparing the layer 3 information to confirm that the layer 3 frame fragments are part of the same layer 4 data stream.

Still another aspect of the present invention provides an integrated network switch configured for executing layer 3 switching decisions, the integrated network switch having network switch ports. Each network switch port comprises a policy filter configured for obtaining layer 3 information and layer 4 information from a received layer 2 frame and determining, based on the obtained layer 3 information and layer 4 information, a policy identifier that specifies a layer 3 switching operation to be performed on the corresponding layer 2 frame. Each network switch port also includes a flow identification module configured for identifying the received layer 2 frame as having one of a plurality of layer 3 frame fragments of a layer 4 data stream. The flow identification module also includes a table for storing at least a portion of the obtained layer 3 information and the corresponding policy identifier, the flow identification module selecting the policy identifier for each of subsequent layer 3 frame fragments based on a match between the stored portion of the obtained layer 3 information and a corresponding portion of the layer 3 information in the corresponding layer 3 frame fragment. Use of the table enables the flow identification module to cache the obtained layer 3 information and the corresponding policy identifier for subsequent layer 3 frame fragments. Hence, each network switch port can easily determine layer 3 switching decisions for each of the received layer 3 frame fragments, optimizing non-blocking layer 3 switching in the network switch at the wire rate without imposing substantial burden on the layer 3 switching logic.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

Figure 1:
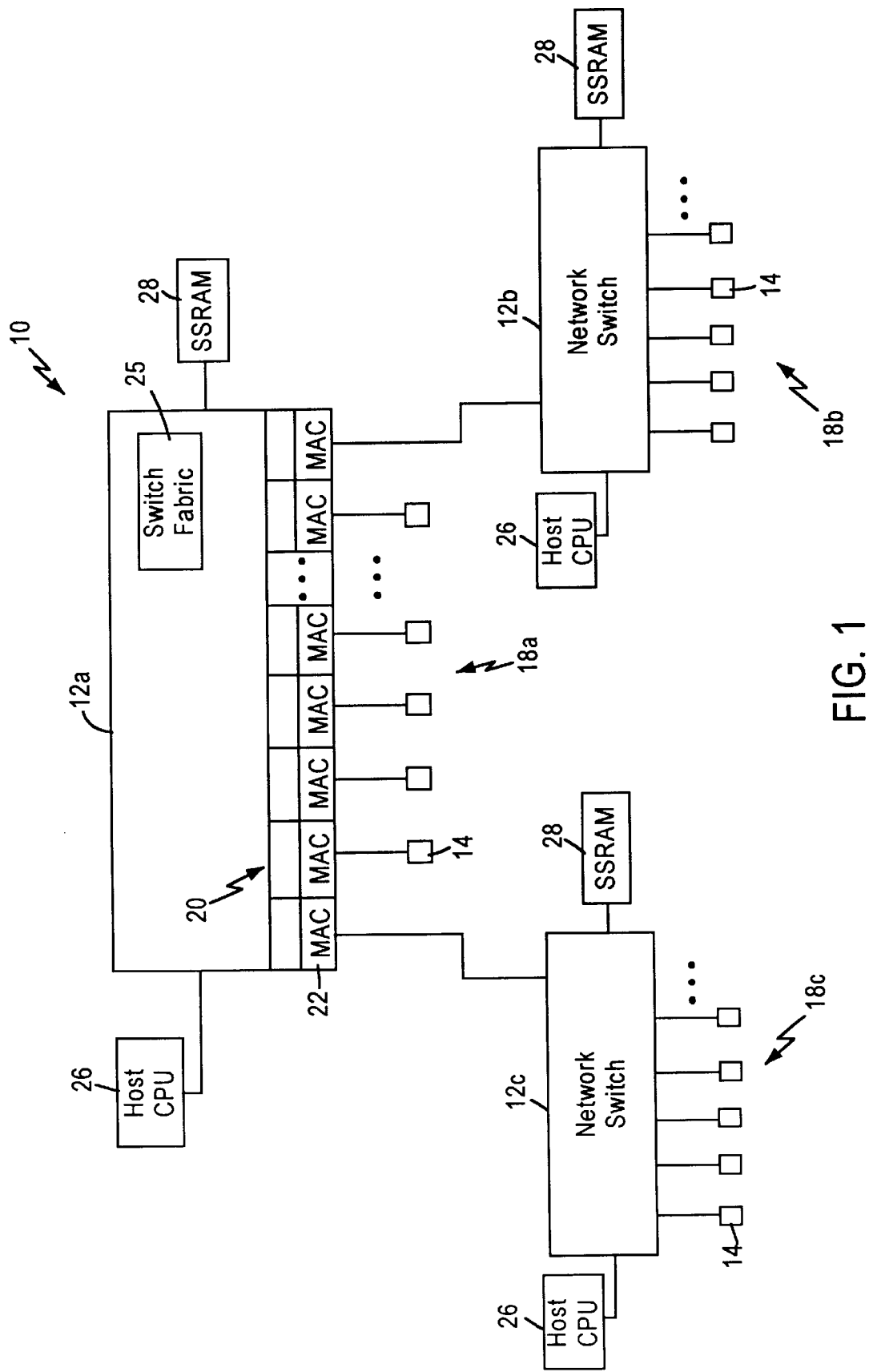
FIG. 1 is a block diagram of a packet switched network including multiple network switches for switching data packets between respective subnetworks according to an embodiment of the present invention.

FIG. 1 is a block diagram illustrating a packet switched network 10, such as an Ethernet (IEEE 802.3) network. The packet switched network includes integrated (i.e., single chip) multiport switches 12 that enable communication of data packets between network stations 14. Each network station 14, for example a client workstation, is typically configured for sending and receiving data packets at 10 Mbps or 100 Mbps according to IEEE 802.3 protocol. Each of the integrated multiport switches 12 are interconnected by gigabit Ethernet links 16, enabling transfer of data packets between subnetworks 18a, 18b, and 18c. Hence, each subnetwork includes a switch 12, and an associated group of network stations 14.

Each switch 12 includes a switch port 20 that includes a media access control (MAC) module 22 that transmits and receives data packets to the associated network stations 14 across 10/100 Mbps physical layer (PHY) transceivers (not shown) according to IEEE 802.3u protocol. Each switch 12 also includes a switch fabric 25 configured for making frame forwarding decisions for received data packets. In particular, the switch fabric 25 is configured for layer 2 switching decisions based on source address, destination address, and VLAN information within the Ethernet (IEEE 802.3) header; the switch fabric 25 is also configured for selective layer 3 switching decisions based on evaluation of an IP data packet within the Ethernet packet.

As shown in FIG. 1, each switch 12 has an associated host CPU 26 and a buffer memory 28, for example an SSRAM. The host CPU 26 controls the overall operations of the corresponding switch 12, including programming of the switch fabric 25. The buffer memory 28 is used by the corresponding switch 12 to store data frames while the switch fabric 25 is processing forwarding decisions for the received data packets.

As described above, the switch fabric 25 is configured for performing layer 2 switching decisions and layer 3 switching decisions. The availability of layer 3 switching decisions may be particularly effective if an end station 14 within subnetwork 18a wishes to send an e-mail message to selected network stations in subnetwork 18b, 18c, or both; if only layer 2 switching decisions were available, then the switch fabric 25 of switch 12a would send the e-mail message to switches 12b and 12c without specific destination address information, causing switches 12b and 12c to flood all their ports. Otherwise, the switch fabric 25 of switch 12a would need to send the e-mail message to a router (not shown), which would introduce additional delay. Use of layer 3 switching decisions by the switch fabric 25 enables the switch fabric 25 to make intelligent decisions as far as how to handle a packet, including advanced forwarding decisions, and whether a packet should be considered a high-priority packet for latency-sensitive applications, such as video or voice. Use of layer 3 switching decisions by the switch fabric 25 also enables the host CPU 26 of switch 12a to remotely program another switch, for example switch 12b, by sending a message having an IP address corresponding to the IP address of the switch 12b; the switch 12b, in response to detecting a message addressed to the switch 12b, can forward the message to the corresponding host CPU 26 for programming of the switch 12b.

According to the disclosed embodiment, each switch port 20 of FIG. 1 is configured for performing layer 3 processing that identifies for the switching fabric 25 a selected layer 3 switching entry, enabling the switching fabric 25 in response to execute the appropriate layer 3 switching decision corresponding to the identified layer 3 switching entry. Specifically, users of the host processor 26 will specify policies that define how data packets having certain IP protocols should be handled by the switch fabric 25. These policies are implemented by loading into the switch fabric 25 a set of layer 3 switching decisions for each corresponding layer 3 switching entry; in other words, each layer 3 switching entry has a corresponding unique set of layer 3 and possiblye layer 4 address values, for example specific values for a IP source address, an IP destination address, a transmission control protocol (TCP) source port, a TCP destination port, a user datagram protocol (UDP) source port, and/or a UDP destination port. Given these address fields within the layer 3 and layer 4 headers, a set of layer 3 switching decisions can be established for each set of unique address fields.

The network switch port 20 is configured for generating a multi-key packet signature to be used as a search key for searching of a layer 3 switching entry for the received data packet. Specifically, the network switch port 20 generates multiple hash keys based on the four parameters in every packet, namely IP source address, IP destination address, TCP/UDP source port, and TCP/UDP destination port. These hash keys are combined to form the packet signature, which is then compared by the network switch port 20 with precomputed entry signatures to determine possible matches. The layer 3 switching entries are stored in addresses that are a function of the corresponding entry signature, hence the network switch port 20 can identify the selected layer 3 switching entry that should be used for layer 3 switching decisions based on a match between the corresponding entry signature and the packet signature. The network switch port 20 can then forward the identification of the selected layer 3 switching entry to the switch fabric 25 for execution of the corresponding layer 3 switching decision.

Figure 2:
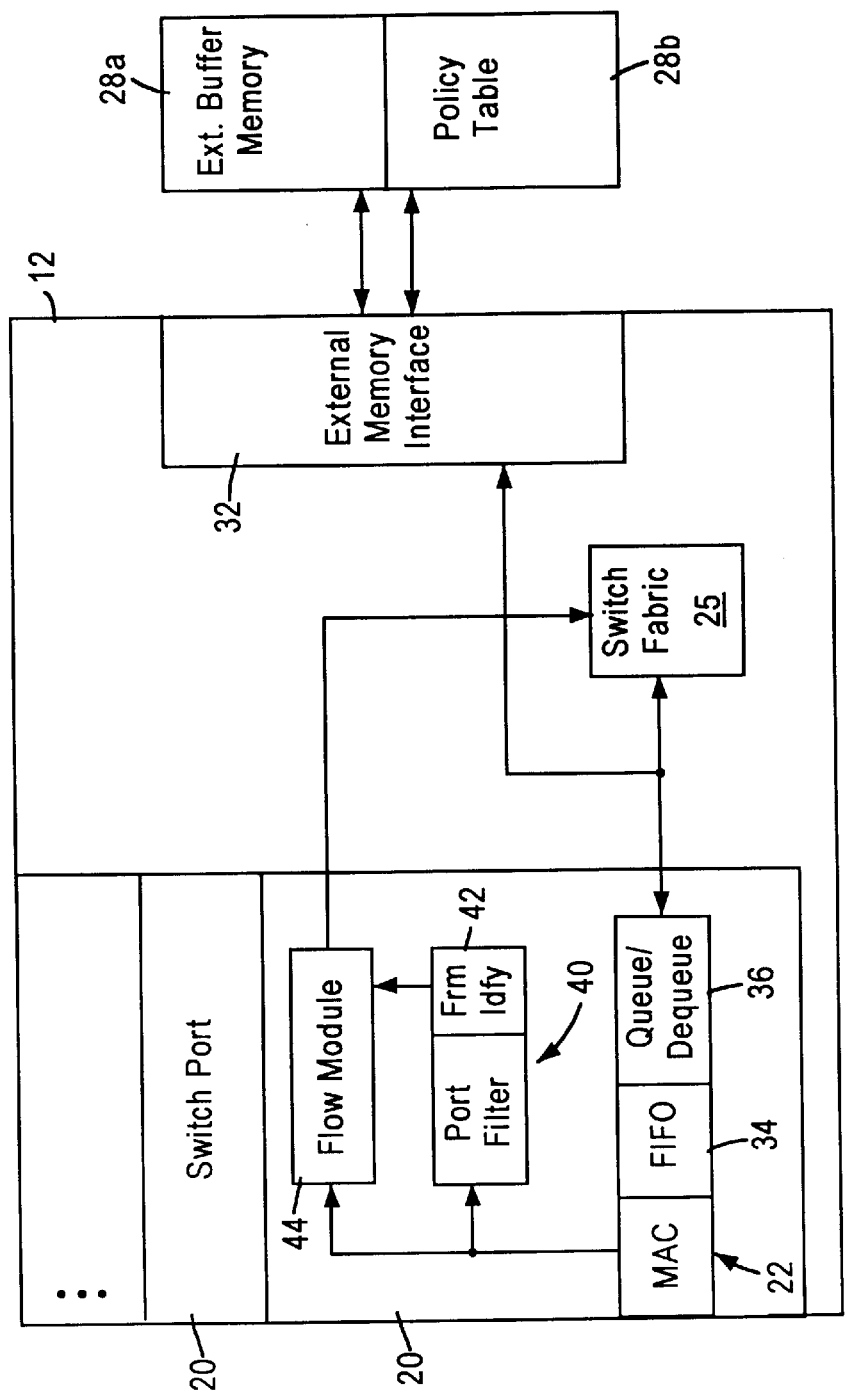
FIG. 2 is a block diagram illustrating in detail the network switch of FIG. 1 according to an embodiment of the present invention.

FIG. 2 is a block diagram illustrating the network switch 12 according to an embodiment of the present invention. The network switch includes a plurality of network switch ports 20, a switch fabric 25, also referred to as an internal rules checker (IRC), that performs the layer 2 and layer 3 switching decisions, and an external memory interface 32 configured for providing access to layer 3 switching entries stored within the external memory 28. In particular, the external memory 28 includes an external buffer memory 28a for storing the frame data, and a policy table 28b configured for storing the layer 3 switching entries at the prescribed addresses, described below. Although shown as a single memory 28, the external buffer memory 28a and the policy table 28b may be implemented as separate, discrete memory devices having their own corresponding memory interface 32 in order to optimize memory bandwidth.

The network switch port 20 includes a MAC portion 22 that includes a transmit/receive FIFO buffer 34 and queuing and dequeuing logic 36 for transferring layer 2 frame data to and from the external buffer memory 28a, respectively.

The network switch port 20 also includes a port filter 40 that includes a frame identifier. The port filter 40 is configured for performing various layer 3 processing, for example identifying whether the incoming data packet includes a layer 3 IP datagram. The frame identifier 42 is configured for identifying the beginning of the IP frame, and locating the layer 3 address entries as the IP frame is received from the network. In particular, the flame identifier identifies the start position of the IP source address, IP destination address, TCP/UDP source port, and TCP/UDP destination port as the data is being received. The network switch port 20 also includes a flow module 44 configured for generating a packet signature using at least two (preferably all four) layer 3 address entries as their start position is identified by the frame identifier 42. In particular, the flow module 44 monitors the incoming data stream, and obtains the IP source address, IP destination address, TCP/UDP source port, and TCP/UDP destination port in response to start position signals output by the frame identifier 42.

The flow module 44, in response to obtaining the layer 3 address fields IP source address, IP destination address, TCP/UDP source port, and TCP/UDP destination port, generates for each of the layer 3 address fields a hash key using a prescribed hashing operation, e.g., a prescribed hash polynomial. The flow module 44 then combines the four hash keys to form a packet signature. The packet signature is then compared with precomputed signatures for the layer 3 switching entries in the policy table 28b.

Once a matching entry signature has been found, the flow module 44 accesses the policy table 28b using the corresponding address to obtain the layer 3 switching entry. The flow module 44 then verifies that the accessed layer 3 switching entry matches the received data packet, and upon detecting a match supplies the identification information to the switching fabric 25 for execution of the corresponding layer 3 switching decision.

Figure 3:
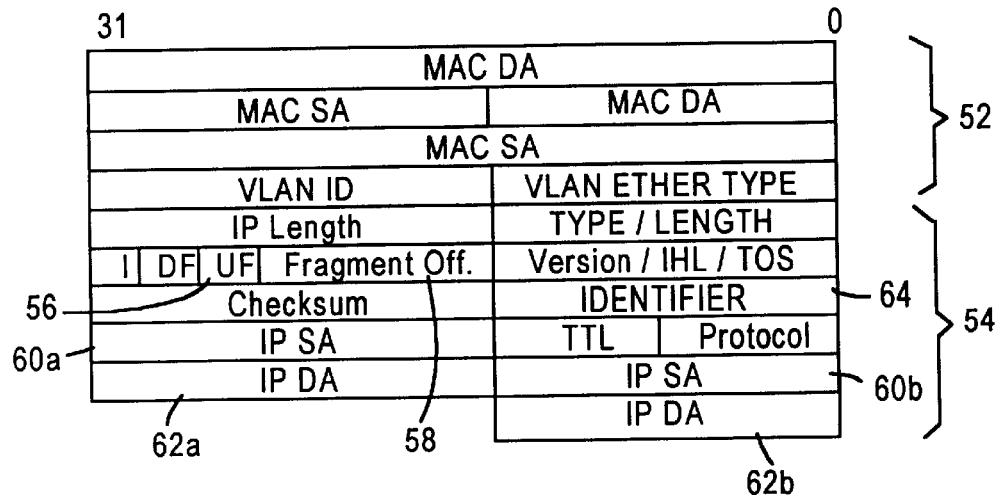
FIG. 3 is a diagram illustrating an Internet Protocol (IP) header.

FIG. 3 is a diagram illustrating in detail a layer 2 header and an IP header of an IP datagram transported across an Ethernet (IEEE 802.3) network. As shown in FIG. 3, the header 50 includes a layer 2 header portion 52 and a layer 3 (IP) header portion 54. The IP header portion 54 includes prescribed fields, for example and "M" bit 56 specifying whether there are more IP frame fragments, and a fragment offset field 58 for identifying a relative position of the corresponding fragment to other fragments within the layer 3 data stream. The IP header portion 54 also includes an IP source address field 60, and IP destination address field 62, and an IP identifier field 64.

Figure 4:
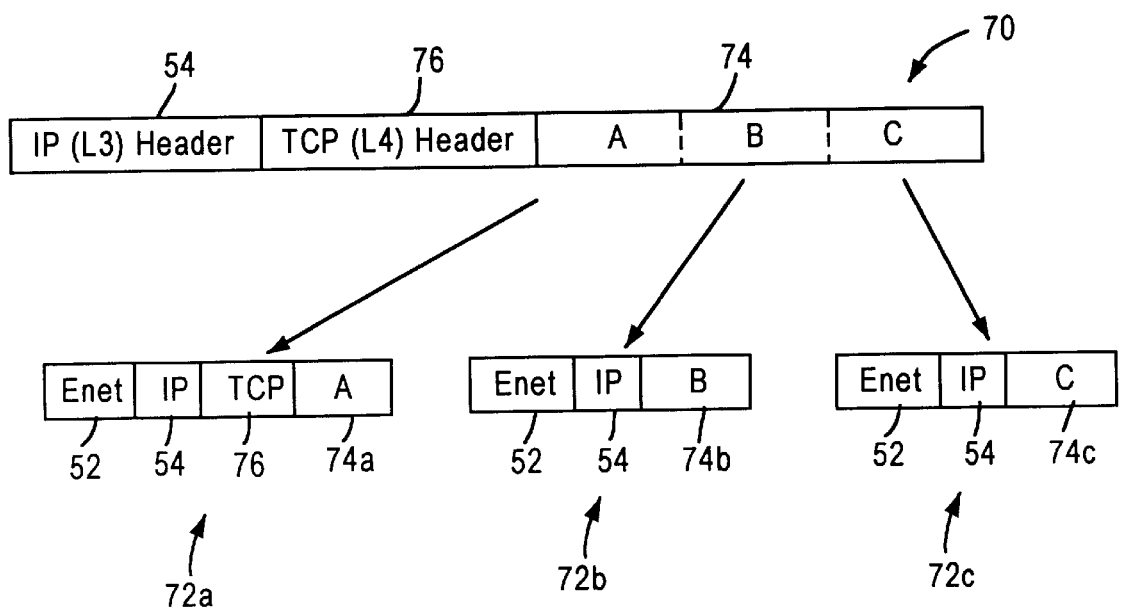
FIG. 4 is a diagram illustrating fragmentation of a layer 3 IP frame into multiple layer 2 data packets.

FIG. 4 is a diagram illustrating fragmentation of an IP datagram 70 into multiple fragments 72 for transmission on layer 2 networks, for example Ethernet (IEEE 802.3). As shown in FIG. 4, the transmitting network node generates layer 4 payload data 74 (e.g., components A, B, and C), and layer 4 header information 76, for example transmission control protocol (TCP) source port, destination port, etc. that identifies the layer 4 payload data 74 as belonging to a prescribed layer 4 data stream. The transmitting network node adds the layer 3 header information 54 to the layer 4 header 76 and the layer 4 payload 74 to generate the IP datagram 70. Given the length of the IP datagram 70 and the maximum length constraints of layer 2 packets, the transmitting network node might need to fragment the IP datagram 70 into fragments 72a, 72b, and 72c.

As recognized in the art, the first layer 2 packet 72a includes an Ethernet header 52, the IP header 54, the TCP header 76, and a portion of the layer 4 payload data 74a; however, subsequent fragments 72b and 72c will not include the TCP information, but rather include only the Ethernet header 52, the IP header 54, and the layer 4 portions 74b and 74c, respectively. Hence, a network switch normally would be unable to perform layer 3 processing on the frame fragments 72b and 72c without the layer 4 header information 76.

According to the disclosed embodiment, each network switch port 20 includes a flow identification module having a table for storing layer 3 information obtained from the first frame fragment 72a, plus a corresponding policy identifier that specifies the layer 3 switching operation to be performed on the frame fragment 72a. In particular, the table enables the flow identification module to learn the layer 3 switching policy to be applied to each fragment of a specified flow. The flow identification module extracts a portion of the layer 3 information, namely the IP source and IP identifier to uniquely identify all the frame fragments 72 that correspond to an identified IP datagram 70 of a layer 4 flow. Hence, layer 3 policies can be identified by each network switch port receiving frame fragments 72 from the network.

Figure 5:
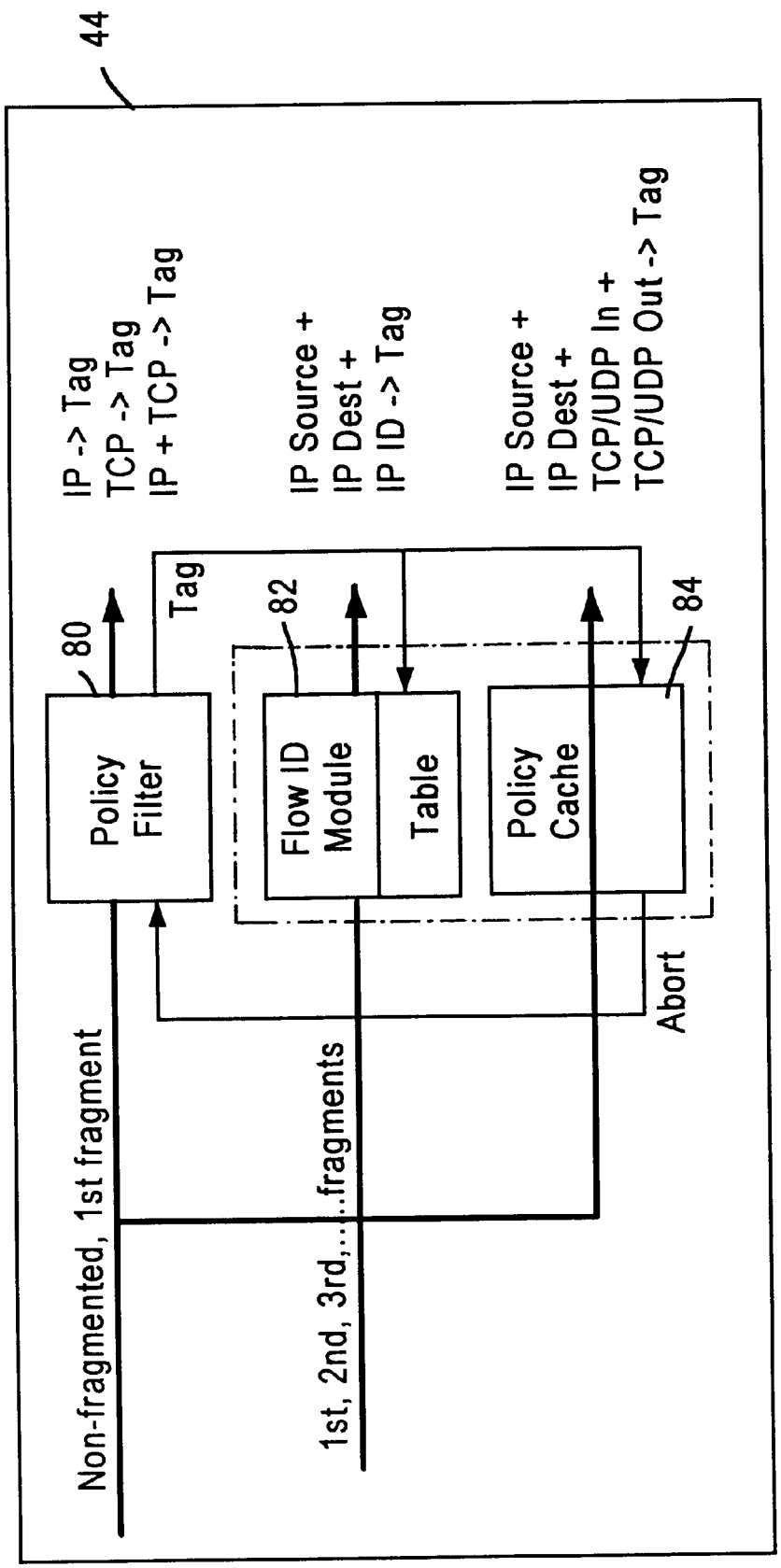
FIG. 5 is a block diagram illustrating in further detail the flow identification module of FIG. 2 according to an embodiment of the present invention.

FIG. 5 is a diagram illustrating in detail the flow module 44 of FIG. 2 according to an embodiment of the present invention. As shown in FIG. 5, the flow module 44 includes a policy filter 80, a flow identification module 82, and a policy cache 84. The policy filter 80 is configured for determining a policy identifier that specifies a layer 3 switching operation to be performed on a corresponding layer 2 frame for all non-fragmented packets and the first fragment of a fragmented flow. In particular, the policy filter 80 obtains the layer 3 information (such as IP source address, IP destination address), and layer 4 information (such as TCP source port or TCP destination port) from the non fragmented IP packet 70 or the first IP fragment in the layer 2 packet 72a. The flow module 44 determines the policy identifier based on the obtained layer 3 information and layer 4 information. As described above, the policy filter 80, upon determining the policy identifier, accesses the policy cache 84 to determine if the relevant switching information is stored. The policy cache 84, which stores for each entry an IP source address, IP destination address, TCP/UDP input port, TCP/UDP output port, and corresponding policy identifier, is used by the policy filter 80 to check if any non fragmented packets have been classified earlier with respect to the corresponding policy identifier; if so, the policy filter 80 can reuse the previous search results stored in the policy cache 84. If the policy cache 84 does not have the needed entry, the policy filter 80 accesses the policy table 28b and stores the policy identifier (tag) and the corresponding switching information (e.g., IP source address, IP destination address, TCP/UDP input port, TCP/UDP output port) into the policy cache 84 for local use.

The flow identification module 82 stores the IP source address, IP destination address, the IP identifier 64, and the corresponding policy identifier (tag) into an internal table 86 at the same time that the data is written into the policy cache 84. The flow identification module 82 uses the combination of the IP source address and the IP identifier to uniquely identify each of the data fragments 72 as belonging to the same IP datagram 70 for a given layer 4 data flow. Hence, the flow identification module 82 can select the policy identifier for each of the subsequent layer 3 frame fragments 72b and 72c based on a match between the IP source address and IP identifier stored in the table 86 and the IP source address 60 and the IP identifier 64 in each of the layer 3 frame fragments 72b and 72c.

Figure 6:
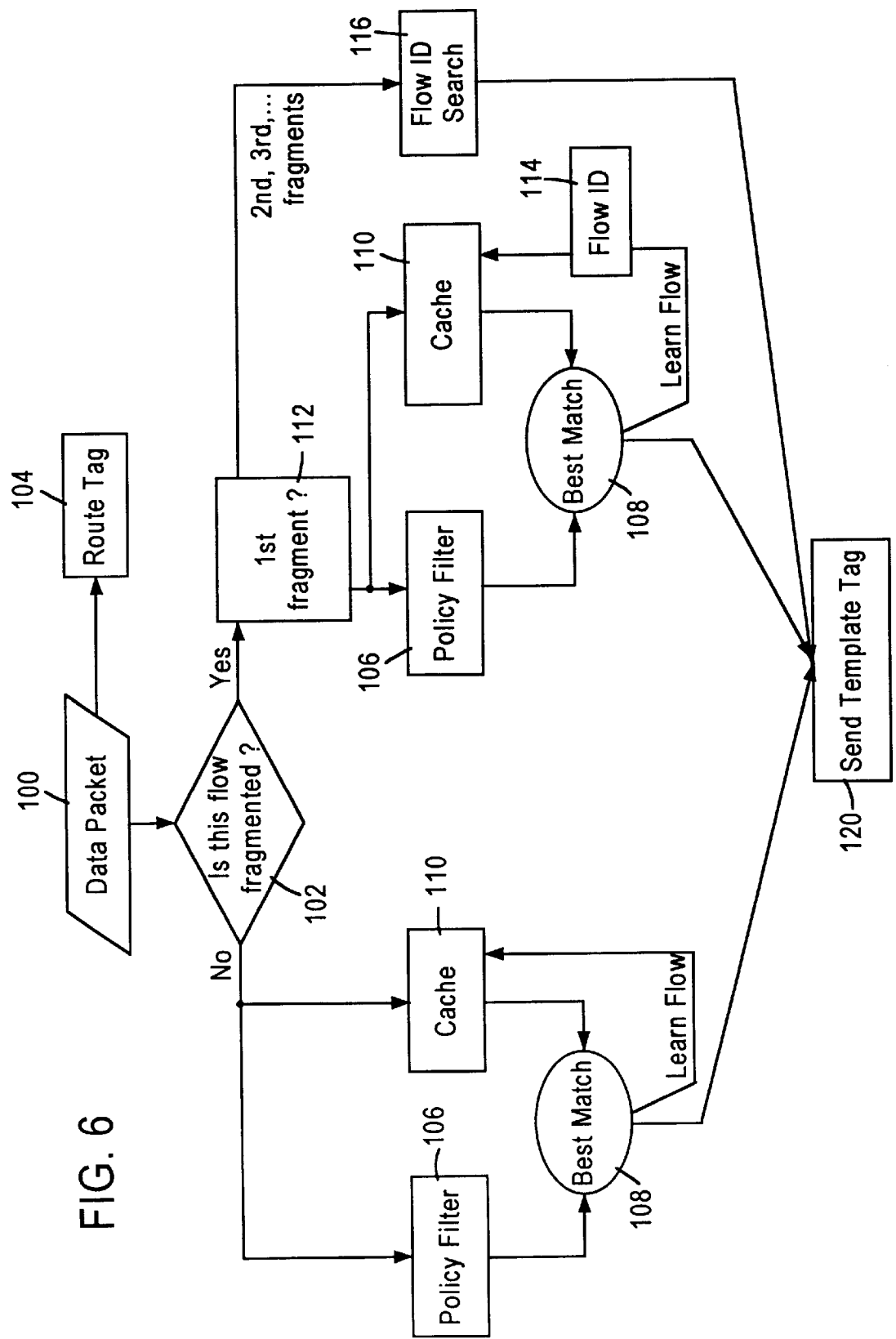
FIG. 6 is a flow diagram illustrating the method of selecting a policy identifier for fragmented layer 3 frames according to an embodiment of the present invention.

FIG. 6 is a diagram illustrating the method of identifying layer 3 switching decisions for the IP frame fragments 72 according to an embodiment of the present invention. As shown in FIG. 6, the method begins by receiving the layer 2 data packet in step 100 by the MAC 22. The flow module 44 determines whether the received layer 2 data packet includes a fragmented IP frame, for example by analyzing the more bit 56 and the fragment offset field 58 in step 102. At the same time, the queuing logic 36 generates a routing tag in step 104 for storage of the received data frame into the external buffer memory 28a.

If in step 102 the flow module 44 determines that the flow is not fragmented, then the policy filter 80 determines the policy identifier in step 106 based on the IP source address, and the TCP source port address. The policy filter determines the best match for the policy identifier in step 108, and accesses the policy cache 84 to determine whether the identified policy tag is present; if the identified policy tag is not in the policy cache 84, the policy filter 80 fetches the table entry from the policy table 28 the and stores the fetched entry into the cache 84 in step 110. The policy filter 80 then outputs the policy identifier as a template tag to the layer 3 switching logic in the switch fabric 25 in step 120.

If in step 102 the flow module 44 determines that the flow is fragmented, if the fragment is the first fragment in step 112, the policy filter 80 performs the same operation in steps 106, 108, and 110, and outputs the template tag to the switch fabric in step 120. However in this case, the flow identification module 82 monitors the output bus of the policy filter 80, and stores into the table 86 the IP source address, IP destination address (optional), the IP identifier, and the corresponding policy tag of the first IP fragment in step 114.

If in step 112 the fragment is not the first fragment, the flow identification module 82 performs a lookup in the table 86, using the IP source address and IP identifier of the corresponding received frame fragment. The flow identification module 82 then outputs the tag for use by the layer 3 switching logic in step 120.

According to the disclosed embodiment, a network switch 12 is able to efficiently search for layer 3 switching information for layer 3 frame fragments by storing layer 3 information from a first layer 3 fragment and a policy identifier that specifies a layer 3 switching operation to be performed based on layer 3 information and layer 4 information within the first layer 3 fragment. Hence, layer 3 frame fragments received by a network switch port can be properly processed, even though subsequent frame fragments cannot contain all the information normally necessary to perform layer 3 switching decisions in implementing user-defined policies. In addition, the determination of the proper policy identifier for the layer 3 frame fragments by the network switch port provides distributed layer 3 processing within an integrated network switch, enabling the network switch to be implemented as a single select chip capable of operating at 100 Mb/s and gigabit network data rates without blocking within the network switch.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a network switch, the method comprising:
receiving a first layer 2 frame at a network switch port, the first layer 2 frame including first layer 3 information and layer 4 information that specify payload data characteristics within the first layer 2 frame;
determining a policy identifier in the network switch port for the first layer 2 frame based on the first layer 3 information and the layer 4 information, the policy identifier specifying a layer 3 switching operation to be performed on the first layer 2 frame;
receiving a second layer 2 frame at the network switch port, the second layer 2 frame including a portion of the first layer 3 information; and
selecting the policy identifier of the first layer 2 frame for the second layer 2 frame by correlating the second layer 2 frame to the first layer 2 frame based on the portion of the first layer 3 information.

2. The method of claim 1, wherein the selecting step includes storing the policy identifier and the portion of the first layer 3 information, received from the first layer 2 frame, into a memory within the network switch port.

3. The method of claim 2, wherein the correlating step includes searching the memory for the stored portion of the first layer 3 information using the first layer 3 information from the second layer 2 frame as a search key.

4. The method of claim 3, wherein the correlating step further includes identifying the policy identifier by matching the search key to the corresponding stored portion of the first layer 3 information.

5. The method of claim 4, wherein the stored portion of the first layer 3 information includes an Internet Protocol (IP) source address and an IP identifier.

6. The method of claim 5, wherein the stored portion of the first layer 3 information consists of the IP source address and the IP identifier.

7. The method of claim 5, wherein the layer 4 information includes a Transmission Control Protocol (TCP) source port.

8. The method of claim 2, wherein the storing step includes storing the policy identifier and the portion of the first layer 3 information received from the first layer 2 frame into the memory in response to detecting that the first layer 2 frame includes a fragmented layer 3 packet.

9. The method of claim 8, wherein the storing step further includes identifying the fragmented layer 3 packet based on a bit set in the first layer 3 information.

10. The method of claim 8, wherein the storing step further includes identifying the fragmented layer 3 packet based on a set bit and a fragment offset field in the first layer 3 information.

11. A method of identifying a layer 3 switching decision within an integrated network switch, the method including:
identifying within a network switch port a received layer 2 frame as having one of a plurality of layer 3 frame fragments of a layer 4 data stream;
storing, in response to the identification of the received layer 2 frame, first layer 3 information from a first of the layer 3 frame fragments in a memory within the network switch port, and a policy identifier that specifies a layer 3 switching operation to be performed on the corresponding layer 2 frame carrying the first of the layer 3 frame fragments based on the corresponding layer 3 information and layer 4 information; and
selecting the policy identifier, for subsequent ones of the layer 3 frame fragments following the first of the layer 3 frame fragments, based on a portion of the first layer 3 information in each of the subsequent ones of the layer 3 frame fragments.

12. The method of claim 11, wherein the identifying step includes identifying a bit set in a layer 3 header in the received layer 2 frame.

13. The method of claim 12, wherein the selecting step includes searching the memory using the portion of the first layer 3 information from the corresponding one layer 3 frame fragment as a key for locating the corresponding policy identifier.

14. The method of claim 13, wherein the storing step includes storing an Internet Protocol (IP) source address and an IP identifier as the first layer 3 information.

15. The method of claim 14, wherein the storing step further includes detecting the policy identifier from a policy filter within the network switch port, the policy filter configured for identifying the policy identifier based on the first layer 3 information and the layer 4 information.

16. An integrated network switch configured for executing layer 3 switching decisions, the integrated network switch having network switch ports each comprising:
a policy filter configured for obtaining layer 3 information and layer 4 information from a received layer 2 frame and determining, based on the obtained layer 3 information and layer 4 information, a policy identifier that specifies a layer 3 switching operation to be performed on the corresponding layer 2 frame; and
a flow identification module configured for identifying the received layer 2 frame as having one of a plurality of layer 3 frame fragments of a layer 4 data stream, the flow identification module having a table for storing at least a portion of the obtained layer 3 information and the corresponding policy identifier, the flow identification module selecting the policy identifier for each of subsequent layer 3 frame fragments based on a match between the stored portion of the obtained layer 3 information and a corresponding portion of the layer 3 information in the corresponding layer 3 frame fragment.

17. The switch of claim 16, wherein the flow module, searches for the policy identifier using the portion of the layer 3 information in the corresponding layer 3 frame fragment as a key.

18. The switch of claim 16, wherein the policy filter determines the policy identifier based on an Internet Protocol (IP) source address and IP identifier within the obtained layer 3 information, and a Transmission Control Protocol (TCP) source port within the layer 4 information.

19. The switch of claim 18, wherein the flow identification module stores the IP source address and the IP identifier as the portion of the obtained layer 3 information, the flow identification module obtaining from each of the corresponding layer 3 frame fragments the corresponding IP source address and IP identifier.

20. The method of claim 1, wherein selecting the policy identifier occurs at the network switch port.

* * * * *